United States Patent
Bottari et al.

(10) Patent No.: US 9,813,175 B2
(45) Date of Patent: Nov. 7, 2017

(54) METHOD FOR DETECTING TIMING REFERENCES AFFECTED BY A CHANGE IN PATH DELAY ASYMMETRY BETWEEN NODES IN A COMMUNICATION NETWORK

(71) Applicant: Telefonaktiebolaget L M Ericsson (publ), Stockholm (SE)

(72) Inventors: Giulio Bottari, Pisa (IT); Stefano Ruffini, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 43 days.

(21) Appl. No.: 14/913,143

(22) PCT Filed: Aug. 22, 2013

(86) PCT No.: PCT/EP2013/067492
§ 371 (c)(1),
(2) Date: Feb. 19, 2016

(87) PCT Pub. No.: WO2015/024599
PCT Pub. Date: Feb. 26, 2015

(65) Prior Publication Data
US 2016/0211936 A1   Jul. 21, 2016

(51) Int. Cl.
*H04L 12/28* (2006.01)
*H04J 3/06* (2006.01)
*H04L 12/26* (2006.01)
*H04L 12/24* (2006.01)

(52) U.S. Cl.
CPC .......... *H04J 3/0682* (2013.01); *H04J 3/0641* (2013.01); *H04J 3/0667* (2013.01); *H04L 41/12* (2013.01); *H04L 43/0858* (2013.01)

(58) Field of Classification Search
CPC ...... H04J 3/0682; H04J 3/0641; H04J 3/0667; H04L 41/12; H04L 43/0858
See application file for complete search history.

(56) References Cited

U.S. PATENT DOCUMENTS 8,750,078 B2 * 6/2014 Inomata ............. H04N 5/23203
368/46
2005/0251603 A1 * 11/2005 Ishii ........................ G06F 1/14
710/110

(Continued)

FOREIGN PATENT DOCUMENTS

EP         1 802 015 A1    6/2007
RU     2008 139 558 A      2/2011

(Continued)

OTHER PUBLICATIONS

"Asymmetry in PTP Networks—What it is and what we do about it" by David Spencer; SEMTECH Corporation, pp. 1-20, 2013.

(Continued)

*Primary Examiner* — Kevin Mew
(74) *Attorney, Agent, or Firm* — Baker Botts, LLP (57) ABSTRACT

A method for detecting a timing reference affected by a change in path delay asymmetry in a communications network comprising a master node having a master clock and a plurality of slave nodes each having a respective slave clock is provided. The method comprises: determining that a first timing reference received by a first slave node indicates a time correction to its slave clock greater than a time correction threshold; determining whether one or more other slave nodes have received a timing reference indicating a time correction to their slave clock greater than a time correction threshold; and determining whether the first timing reference is affected by a change in path delay asymmetry based on the determining of whether one or more other slave nodes have received a timing reference indicating a time correction to their slave clock greater than a time correction threshold. Apparatus and a computer program for detecting a timing reference affected by a change in path delay asymmetry in a communications network are also provided.

25 Claims, 6 Drawing Sheets

(56) References Cited

U.S. PATENT DOCUMENTS

| | | | |
|---|---|---|---|
| 2010/0118721 A1* | 5/2010 | Sakurada | H04J 3/0664 370/252 |
| 2010/0329125 A1 | 12/2010 | Roberts et al. | |
| 2012/0147941 A1 | 6/2012 | Su et al. | |
| 2013/0039359 A1* | 2/2013 | Bedrosian | H04J 3/0697 370/350 |
| 2013/0100832 A1* | 4/2013 | Flinn | H04L 43/0852 370/252 |
| 2013/0209096 A1 | 8/2013 | Le Pallec et al. | |
| 2013/0336341 A1* | 12/2013 | Kamada | H04J 3/0667 370/503 |
| 2014/0348186 A1* | 11/2014 | Ogata | H04J 3/0641 370/508 |
| 2015/0131682 A1* | 5/2015 | Gudipati | H04L 43/0823 370/503 |
| 2016/0197719 A1* | 7/2016 | Wang | H04L 7/04 709/248 |

FOREIGN PATENT DOCUMENTS

| | | |
|---|---|---|
| WO | WO 2012/110109 A2 | 8/2012 |
| WO | WO 2014/029430 A1 | 2/2014 |

OTHER PUBLICATIONS

CPRI Specification v6.0; Interface Sepcification; Common Public Radio Interface (CPRI); Interface Specification, pp. 1-128, Aug. 30, 2013.
Ericsson CTO: Let'Redefine SDN; News Analysis; Ray le Maistre, Editor-in-chief, p. 1, Oct. 16, 2012.
"OpenFlow Switch Specification" Version 1.1.0 Implemented (Wire Protocol 0.02), pp. 1-56, Feb. 28, 2011.
IEEE Standard for a Precision Clock Synchronization Protocol for Networked Measurement and Control Systems; IEEE Instrumentation and Measurement Society; Sponsored by the Technical Committee on Sensor Technology (TC-9), pp. 1-39, Jul. 24, 2008.
International Search Report for International application No. PCT/EP2013/067492, pp. 1-3, dated Dec. 20, 2013.
"Taking SDN from concept to reality—Ericsson", pp. 1-3, Nov. 6, 2012.
Official Action issued by the Federal Institute of Industrial Property for Application No. 2016110099/07 (015939); PCT Application number and date EP2013/067492 dated Aug. 22, 2013-Jun. 28, 2017.

* cited by examiner

Fig. 1

T-GM  Telecom Grand Master
T-BC  Telecom Boundary Clock
T-TSC Telecom Time Stamp Counter
⟶ Time Sync Flow
⟷ PTP Message Exchange
⟵-⟶ PTP Message Exchange over Passive Interface

Fig. 2

Network Rearrangement Altering the Asymmetry (Error Te)

METHOD FOR DETECTING TIMING REFERENCES AFFECTED BY A CHANGE IN PATH DELAY ASYMMETRY BETWEEN NODES IN A COMMUNICATION NETWORK

PRIORITY

This nonprovisional application is a U.S. National Stage Filing under 35 U.S.C. §371 of International Patent Application Serial No. PCT/EP2013/067492, filed Aug. 22, 2013, and entitled "A Method For Detecting Timing References Affected By A Change In Path Delay Asymmetry Between Nodes In A Communications Network."

TECHNICAL FIELD

The invention relates to a method and apparatus for detecting a timing reference affected by a change in path delay asymmetry between nodes in a communications network. The invention further relates to a computer program product which, when run on a computer, carries out a method for detecting a timing reference affected by a change in path delay asymmetry between nodes in a communications network. The invention further relates to a method and apparatus for a slave node.

BACKGROUND

There are many applications which require accurate time synchronisation between nodes in order to operate property, for example mobile technologies such as Wideband Code Division Multiple Access (WCDMA) and Long Term Evolution (LTE). Another example is the Common Public Radio Interface (CPRI) which is used to transport traffic between a Radio Equipment Controller (REC) and Radio Equipment (RE).

It is possible to provide time synchronisation between a pair of network nodes using a timing protocol such as the Network Time Protocol (NTP), defined by IETF RFC 5905 or the Packet Time Protocol (PTP), defined in IEEE 1588.

A master node, which has access to an accurate time source such as a Global Positioning System (GPS), provides a timestamp which, in the case of time synchronisation, is used to measure the roundtrip delay between the master node and a slave node. Based on the assumption that the path delay in the forward direction (from the master node to the slave node) is the same as the path delay in the reverse direction (from the slave node to the master node), the protocol calculates the path delay between the master node and slave node as half the round trip delay. Knowledge of this path delay may then be used to synchronise a clock at the slave node with a master clock at the master node, based on a synchronisation or timing reference received by the slave node from the master node. A similar method for determining path delay, and synchronising nodes, is provided by CPRI specifications.

However, the underlying network infrastructure may mean that the path or propagation delay in the forward direction between a pair of nodes is different from the path or propagation delay in the reverse direction between the pair of nodes. For example, traffic in the forward direction may travel through a different optical fibre from traffic in the reverse direction, or if the traffic in the forward and reverse directions travels through the same optical fibre, the traffic may for example travel on respective wavelength channels and thereby experience different transmission, or processing, characteristics. This difference in path delay is referred to as a path delay asymmetry.

The PTP protocol provides that, if path delay asymmetry between nodes is known, a correction may be made at the slave node to compensate for the path delay asymmetry. Calculating path delay asymmetry is however often extremely costly and time consuming. Path delay asymmetries may be calculated prior to start-up of a network.

However, a significant problem in the deployment of the PTP protocol (and of other protocols that are dependent on symmetric paths, such as CPRI) is that path delay asymmetries may change after start-up of a network, over a length of time such that the changes cannot be filtered out by local clocks at the slave nodes. These asymmetries are sometimes referred to as "Pseudo-constant" asymmetries. These path delay asymmetries may change, for example, due to a network resource failure which results in traffic being routed onto a protection path, or a network resource upgrade or repair. For example, in a network using wavelength-division-multiplexing (WDM), if the lambda scheme is changed, or the dispersion compensation mechanisms are updated, this may result in hundreds of nanoseconds up to several microseconds of additional path delay asymmetry.

SUMMARY

The inventors have appreciated that it would be desirable to provide a method for detecting timing references affected by a change in path delay asymmetry between nodes in a communications network.

A method referred to as "majority voting" has been proposed to detect timing references which are affected by a change in path delay asymmetry. It should be appreciated that this is a non-trivial problem, since if a synchronisation reference received by a slave node appears to require a significant timing correction to its local clock, this may, or may not, be due to a change in path delay asymmetry in the link(s) traversed by the synchronisation reference.

Figure 1:
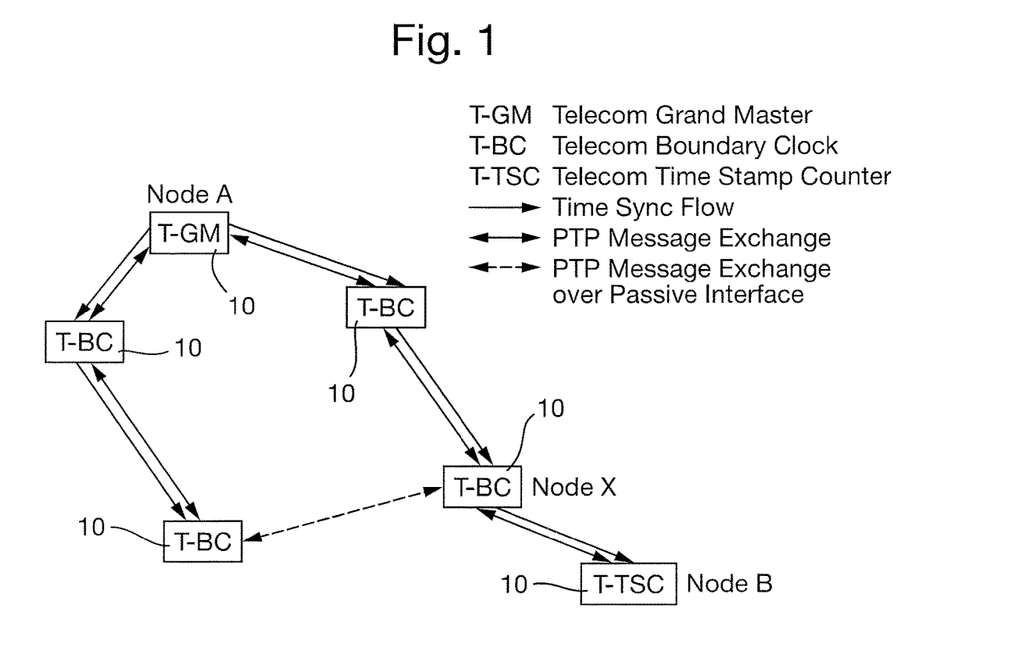
FIG. 1 illustrates a segment of a network and PTP message exchange.

In the "majority vote" method, a node must receive three independent synchronisation references. By way of example, FIG. 1 illustrates a segment of a network comprising a plurality of nodes 10 arranged in a ring. Node T-GM is a master node, which may have access to an accurate time source such as a GPS. Each of nodes T-BC and T-SC are slave nodes. In this example, master node A sends a timing reference to a destination node T-TSC which enables destination node T-TSC to synchronise its local clock with a master clock at the master node (where information about the path delay between the slave node and the master node determined by the PTP protocol is a fundamental prerequisite to achieve accurate synchronization). This timing reference travels across a number of nodes, including node X, as indicated by the single way arrows in FIG. 1. In this way, node X may receive a primary timing reference at a primary interface. In addition, node X may receive a second or passive timing reference at a second or passive interface, which may be obtained for example via PTP messages which are exchanged between nodes X and C as indicated by the dotted line in FIG. 1. Further, in networks using synchronous Ethernet (SyncE), node X may receive a third, SyncE synchronisation reference, which can be used to monitor the primary and passive synchronisation references.

If only one of the synchronisation references changes significantly with respect to the other two synchronisation references, in the "majority vote" method, it is determined that the different synchronisation reference is affected by a change in path delay asymmetry.

However, a disadvantage with this method is that each node must have three independent synchronisation references, which are often not available. Furthermore, this method may lead to an incorrect decision.

Figure 2:
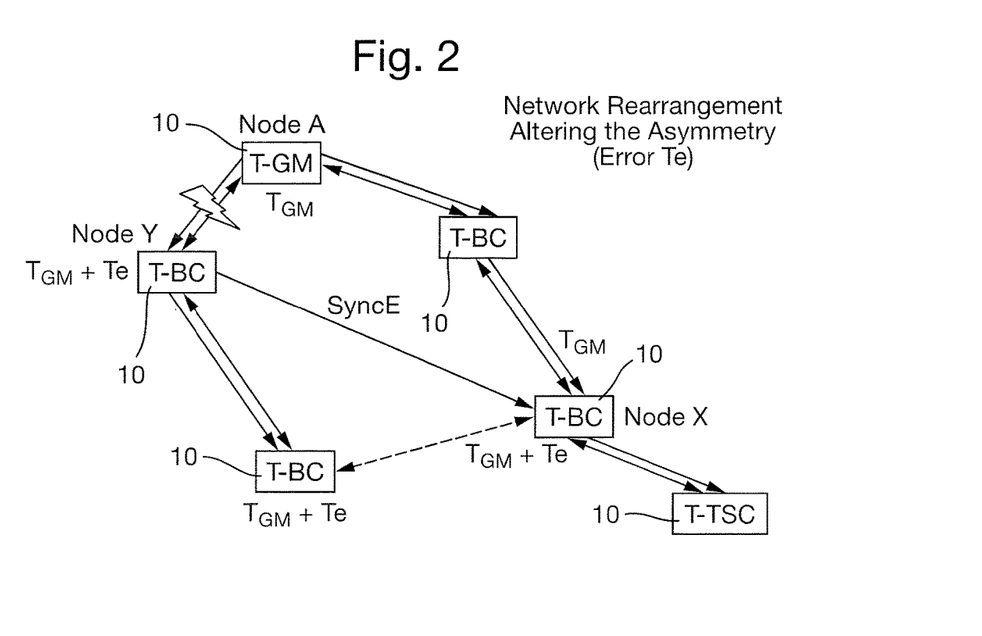
FIG. 2 illustrates the same segment of the network but with a network resource fault or upgrade occurring between two nodes.

FIG. 2 illustrates an example where a network resource upgrade or failure has occurred between nodes A and Y, which results in an additional path delay asymmetry of Te between these nodes. In this example, the primary synchronisation reference received by node X is not affected by this change in path delay asymmetry, since the primary synchronisation reference does not travel via nodes A and Y. However, the passive synchronisation reference is affected by this change in path delay asymmetry. In addition, the SyncE frequency reference may also be affected by this change in path delay asymmetry. Thus, in this case, the "majority vote" method may, incorrectly, determine that it is the primary synchronisation reference which is incorrect.

According to the present invention, there is provided a method of detecting a timing reference affected by a change in path delay asymmetry in a communications network comprising a master node having a master clock and a plurality of slave nodes each having a respective slave clock. The method comprises: determining that a first timing reference received by a first slave node indicates a time correction to its slave clock greater than a time correction threshold; determining whether other slave nodes have received a timing reference indicating a time correction to their slave clock greater than a time correction threshold; and, based on the determining of whether the one or more other slave nodes have received a timing reference indicating a time correction to their slave clock greater than a time correction threshold, determining whether the first timing reference is affected by a change in path delay asymmetry.

Aspects of the present invention have the advantage that timing references affected by a change in path delay asymmetry can be detected, and therefore an appropriate correction can be made, without requiring three independent synchronisation references at a node. Further, aspects of the present invention may enable a change in path delay asymmetry to be detected more accurately than the "majority vote" method. Thus, aspects of the invention may prevent loss of traffic in applications such as WCDMA, LTE and CPRI which have strict synchronisation requirements. Further, aspects of the invention may increase the flexibility to, and scalability of, upgrading networks to include new technologies which may result in changes in path delay asymmetry.

Aspects of the invention may be performed at a network control entity such as but not limited to a Network Management System (NMS), a control plane manager or a Software Defined Network (SDN) controller. In a preferred embodiment, the network control entity may be arranged to communicate with a plurality of network domains, which may comprise respective technologies. In this case, one or more of the slave nodes may be in a different network domain from the other slave nodes (and the master node).

In preferred embodiments of the present invention, determining whether the first time correction is affected by a change in path delay asymmetry comprises: determining whether the first timing reference is affected by a change in path delay asymmetry based on which, if any, of the one or more other slave nodes have received a timing reference indicating a time correction to their slave clock greater than a time correction threshold and knowledge of the topology of the communications network.

In preferred embodiments of the present invention, determining that the first timing reference received by the first slave node indicates a time correction to its slave clock greater than a time correction threshold comprises: receiving an indication that a timing reference received by the first slave node indicates a time correction to its slave clock greater than a time correction threshold; and determining that the first timing reference received by the first slave node indicates a time correction to its slave clock greater than a time correction threshold based on the indication.

Further, in preferred embodiments of the present invention, determining whether one or more other slave nodes have received a timing reference indicating a time correction to their slave clock greater than a time correction threshold, comprises: for each of the one or more other slave nodes which has received a timing reference indicating a time correction to their slave clock greater than a time correction threshold, receiving an indication that a timing reference received by that slave node indicates a time correction to its slave clock greater than a time correction threshold; and determining whether the one or more other slave nodes have received a timing reference indicating a time correction to their slave clock greater than a time correction threshold based on the, if any, indication(s).

These indications may be sent by the slave nodes.

These embodiments have the advantage that it may be simpler for the detecting apparatus to determine whether a slave node has received a timing reference requiring a time correction greater than a time correction threshold. Further, since the slave nodes may be configured to only send an indication when a received timing reference requires a time correction greater than a time correction threshold, the amount of bandwidth required to send information to the detecting apparatus may be limited.

Each time correction threshold may be set such that time corrections greater than the time correction threshold are indicative that a timing reference may be affected by a change in path delay asymmetry. The time corrections may be forward time corrections or backwards time corrections. The term "time correction" refers to the magnitude of the time correction. In a preferred embodiment, there may be a single time correction threshold for both forward and backwards time corrections. However, alternatively, there could be two time correction thresholds, one for forward time corrections and another for backwards time corrections, which could for example be set at slightly different levels.

The receiving apparatus may deduce from the absence of an indication that a timing reference received by a node indicates a time correction greater than a time correction threshold, that any timing reference(s) received by that node do not indicate a time correction greater than the time correction threshold.

The method may further comprise determining a path delay asymmetry correction for the first timing reference.

In a preferred embodiment, wherein the first slave node receives a second timing reference, determining a path delay asymmetry correction for the first timing reference comprises: determining a path delay asymmetry correction for the first timing reference based on a difference between the timing correction indicated by the first timing reference and the timing correction indicated by the second timing reference.

The method may further comprise sending the path delay asymmetry correction for the first timing reference to the first slave node.

This method is advantageous since a path delay asymmetry correction for the first timing reference may be determined in a simple, accurate way. Preferably, this determination is performed by the apparatus which detects that the first timing reference is affected by a change in path delay asymmetry. However, alternatively, this determination may be performed by a separate apparatus, for example at the slave node. In other embodiments, a path delay asymmetry correction for the first timing reference may be determined in a different way, for example using automatic means for calculating path delay asymmetry, if these are present.

In a preferred embodiment of the present invention, the method further comprises receiving an indication that a network resource is undergoing a re-configuration. The method comprises delaying determining whether a first timing reference is affected by a change in path delay asymmetry until the network resource is re-configured.

This embodiment has the advantage that if, for example, a maintenance operation is being carried out which causes a timing reference to suggest that a significant time correction is required (for example by letting a clock enter holdover or a free running condition), it is not detected whether a timing reference is affected by a change in path delay asymmetry, until after the network has settled, and the network resource is re-configured. This may avoid incorrectly detecting a change in path delay asymmetry.

According to the present invention, there is further provided apparatus for detecting a timing reference affected by a change in path delay asymmetry in a communications network comprising a master node having a master clock and a plurality of slave nodes each having a respective slave clock. The apparatus comprises a determining unit. The determining unit is configured to: determine that a first timing reference received by a first slave node indicates a time correction to its slave clock greater than a time correction threshold; determine whether one or more other slave nodes have received a timing reference indicating a time correction to their slave clock greater than a time correction threshold; and determine whether the first timing reference is affected by a change in path delay asymmetry based on whether the one or more slave nodes have received a timing reference indicating a time correction to their slave clock greater than a time correction threshold.

The determining unit may comprise a processor. The determining unit may comprise any combination of software and/or hardware.

There is further provided network control entity comprising apparatus as described above. The network control entity may be a network management system (NMS), a control plane manager or a software defined network (SDN) controller.

According to the present invention, there is further provided a method at a slave node having a slave clock. The method comprises: determining that a timing reference received by the slave node indicates a timing correction to its slave node greater than a time correction threshold; and sending an indication that a timing reference received by the slave node indicates a time correction to its slave node greater than the time correction threshold to apparatus for detecting a timing reference affected by a change in path delay asymmetry.

The indication may comprise a value representing the time correction required by the timing reference.

The method may further comprise, at the slave node, receiving a path delay asymmetry correction for the timing reference, and applying the path delay asymmetry correction.

There is further provided apparatus for a slave node having a slave clock. The apparatus comprises a determining unit configured to determine that a timing reference received by the salve node indicates a timing correction to its slave clock greater than a time correction threshold. The apparatus further comprises a sending unit configured to send an indication that a timing reference received by the slave node indicates a time correction to its slave clock greater than the time correction threshold to apparatus for detecting a timing reference affected by a change in path delay asymmetry as described above.

The determining unit and the sending unit may comprise a processor. The determining unit and the transmitting unit may comprise any combination of software and/or hardware.

There is further provided a slave node comprising apparatus for a slave node having a slave clock as described above.

There is further provided a computer program product which, when run on a computer, carries out a method as described above. The computer program product may be stored on a computer readable medium, or it could for example be in the form of a signal such as a downloadable data signal or in any other form.

BRIEF DESCRIPTION OF THE DRAWINGS

Embodiments will now be described by way of example only with reference to the accompanying drawings in which.

DETAILED DESCRIPTION

Figure 3:
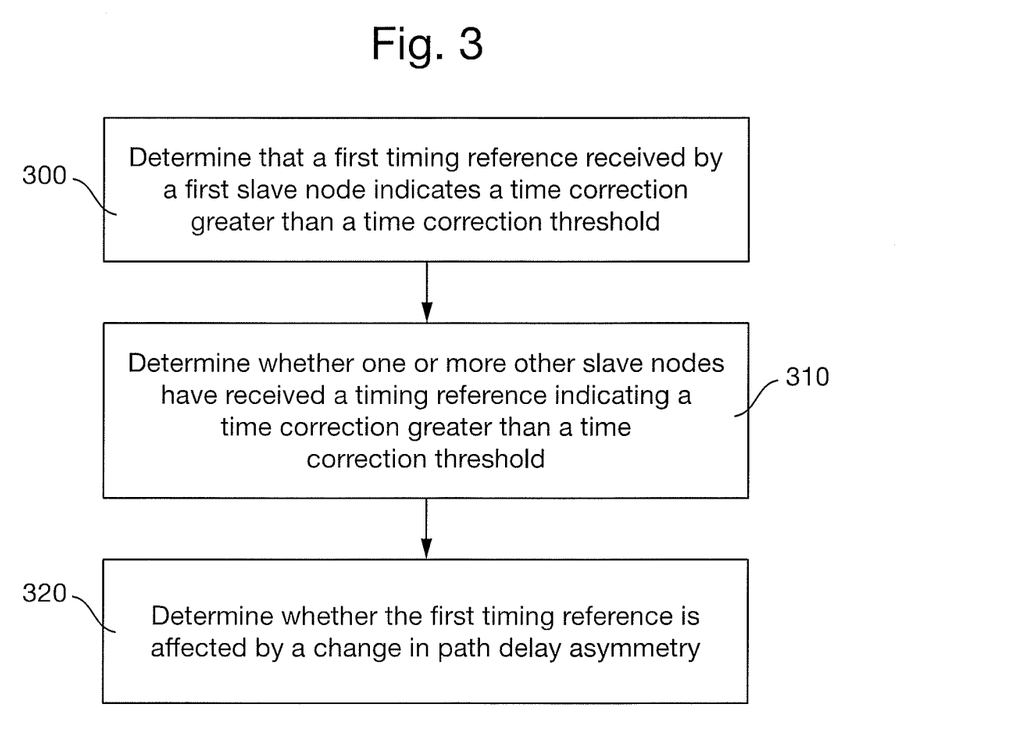
FIG. 3 is a flow chart showing steps according to an embodiment of the present invention.

FIG. 3 illustrates a flow chart showing steps in a method of detecting a timing reference affected by a change in path delay asymmetry between nodes in a communications network according to an embodiment of the present invention. At step 300, it is determined that a first timing reference received by a first slave node indicates a time correction to its slave clock greater than a time correction threshold. At step 310, it is determined whether each of one or more other slave nodes have received a timing reference indicating a time correction to their respective slave clock greater than a time correction threshold; and at step 320, based on the determining of whether each of the one or more other slave nodes have received a timing reference indicating a time correction to their respective slave clock greater than a time correction threshold, it is determined whether the first timing reference is affected by a change in path delay asymmetry.

The method may be performed at a network control entity, such as but not limited to a Network Management System (NMS), a control plane manager, or a SDN controller, which may be able to communicate with a plurality of network domains.

Figure 4:
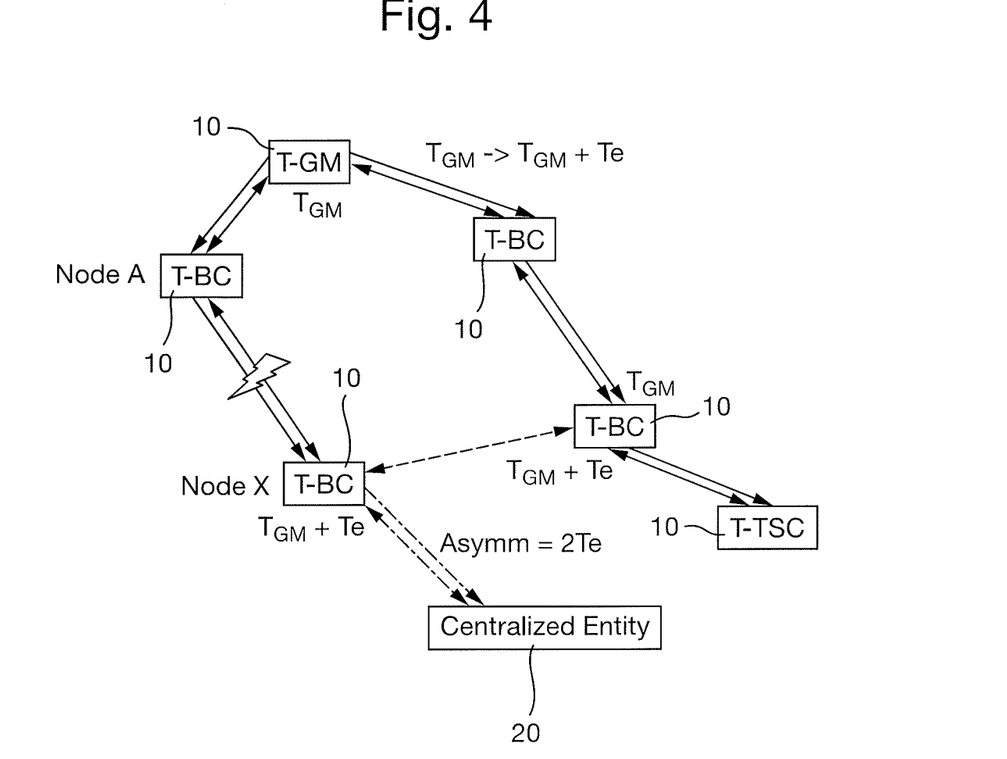
FIG. 4 illustrates a segment of a network by way of an example of an embodiment of the present invention.

By way of example, FIG. 4 shows a schematic view of a segment of a communications network comprising a plurality of nodes 10. The network may for example be a mobile backhaul network, carrying WCDMA or LTE signals. Alternatively, the network may be part of a radio access network connecting a Base Station hub comprising a plurality of Radio Equipment Controllers with respective Radio Equipment at respective antenna sites. The radio access network may carry CPRI signals between the Radio Equipment Controllers and Radio Equipment.

Node T-GM is a master node, which may have access to an accurate time source such as a GPS. Each of nodes T-BC and T-BS are slave nodes. Each node, including the master node, comprises a local clock. The clock at the master node may be referred to as a master clock and the clocks at each of the slave nodes may be referred to as slave clocks. In this example, the nodes 10 are connected in a ring topology, but alternatively the nodes 10 could be connected in a different topology such as a mesh topology. In this example, each of nodes T-BC is connected to two neighbour nodes. Node T-BS is connected to a single neighbour node. Each of the links between neighbour nodes is bidirectional, whereby traffic, such as data packets, can travel in both a forward and a reverse direction between the nodes. The traffic may be carried for example by optical or microwave signals, or any other suitable signal. Each link may comprise any suitable transmission medium. For example each link may comprise a single optical fibre, or a pair of optical fibres where the forward and reverse paths between two nodes are on respective optical fibres.

As indicated by the two-way arrows in FIG. 4, in this example, PTP messages may be exchanged between each pair of neighbour nodes, which enable the round trip delay to be calculated between those respective pairs of nodes.

As indicated by the single arrows in FIG. 4, a primary timing reference is sent by master node T-GM to slave nodes T-TSC and node T-BC X respectively. For example, this timing reference may be carried in data packets. The timing reference sent to node T-TSC travels via nodes T-BC B and C. The timing reference sent to node T-BC X travels via node T-BC A. These timing references enable the slave nodes, T-BC X and T-TSC, to synchronise their local clocks with the clock of the master node. The slave nodes may account for the path or propagation delay of the timing references based on the path delay calculated by the PTP messages for the paths traversed by the timing references. The slave nodes may further, where a value for path delay asymmetry is known, apply a correction for path delay asymmetry. Path delay asymmetry may, for example, be determined for each of the links prior to start-up of the network.

In this example, it is seen that there is a change in network resource(s) on at least one of the forward and/or reverse paths between nodes A and X. This change in network resources may be caused, for example, by a network resource failure on a "working" forward and/or reverse path between nodes A and X, which means that traffic between those nodes is routed onto a protection path between those nodes which travels across different network resources. Or, the change in network resources may be due to a change in the configuration of existing network resources on a forward and/or reverse path between the nodes, for example due to a network resource upgrade or repair. It will be appreciated by those skilled in the art, such changes in network resources may result in a change in path delay asymmetry, although they may not.

In this example, the primary timing reference received by node X suggests that a time correction to its slave clock is required which may mean that the timing reference is affected by a change in path delay asymmetry. The time correction is greater than a time correction threshold. As the skilled person will appreciate timing references are distributed in communications networks, since clocks drift over time. Typically, time corrections required because of clock drift are relatively small, for example tens of nanoseconds. Time corrections suggested as a result of a change in path delay asymmetry are however typically larger, for example they may be hundreds of nanoseconds or larger. Thus, by setting the time correction threshold at an appropriate level, for example 200 nanoseconds, only time corrections indicative of a change in path delay asymmetry may be determined by comparing the size or magnitude of the indicated time correction to the time correction threshold.

Figure 5:
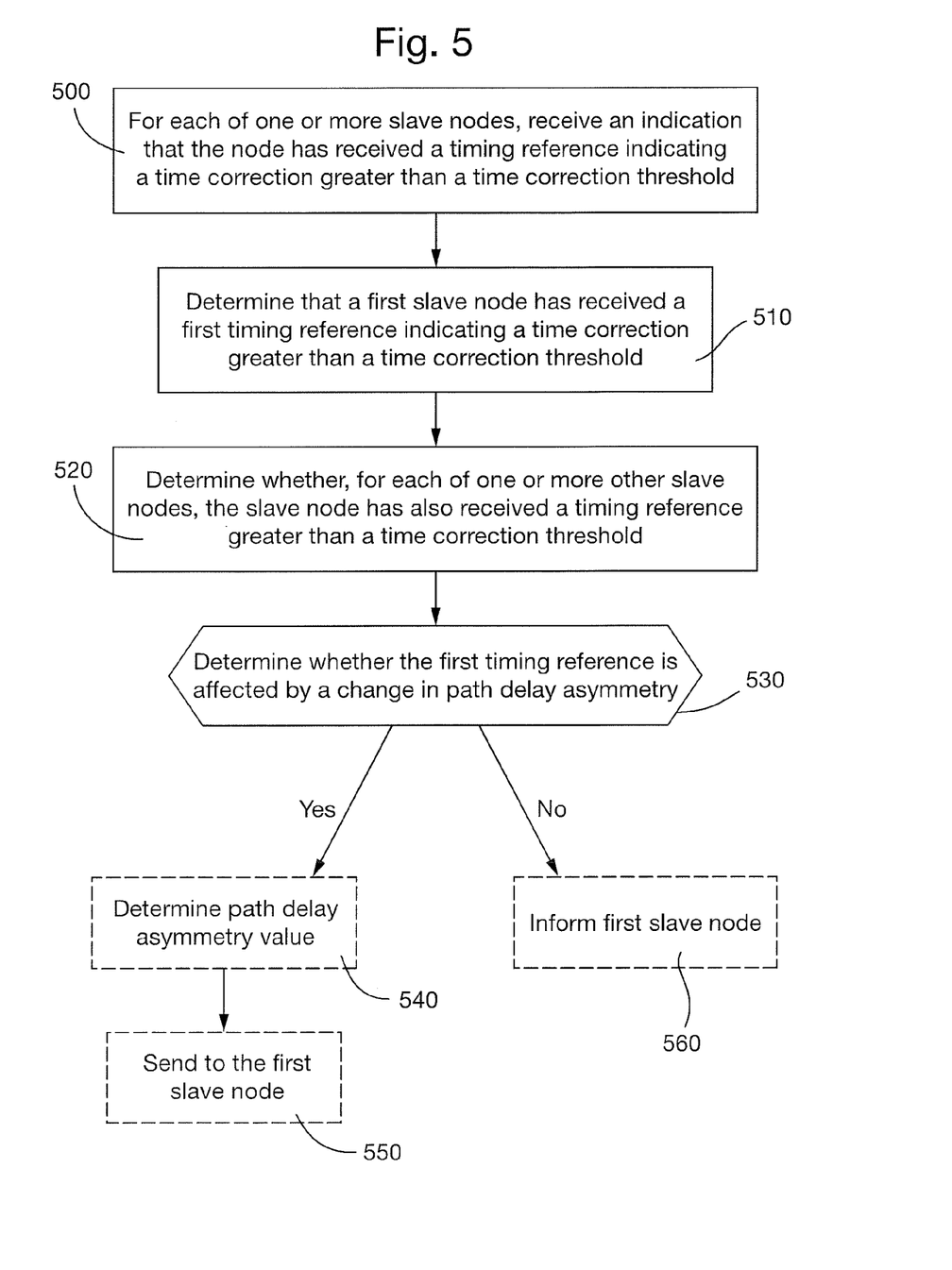
FIG. 5 is flow chart showing steps according to a preferred embodiment of the present invention.
Figure 6:
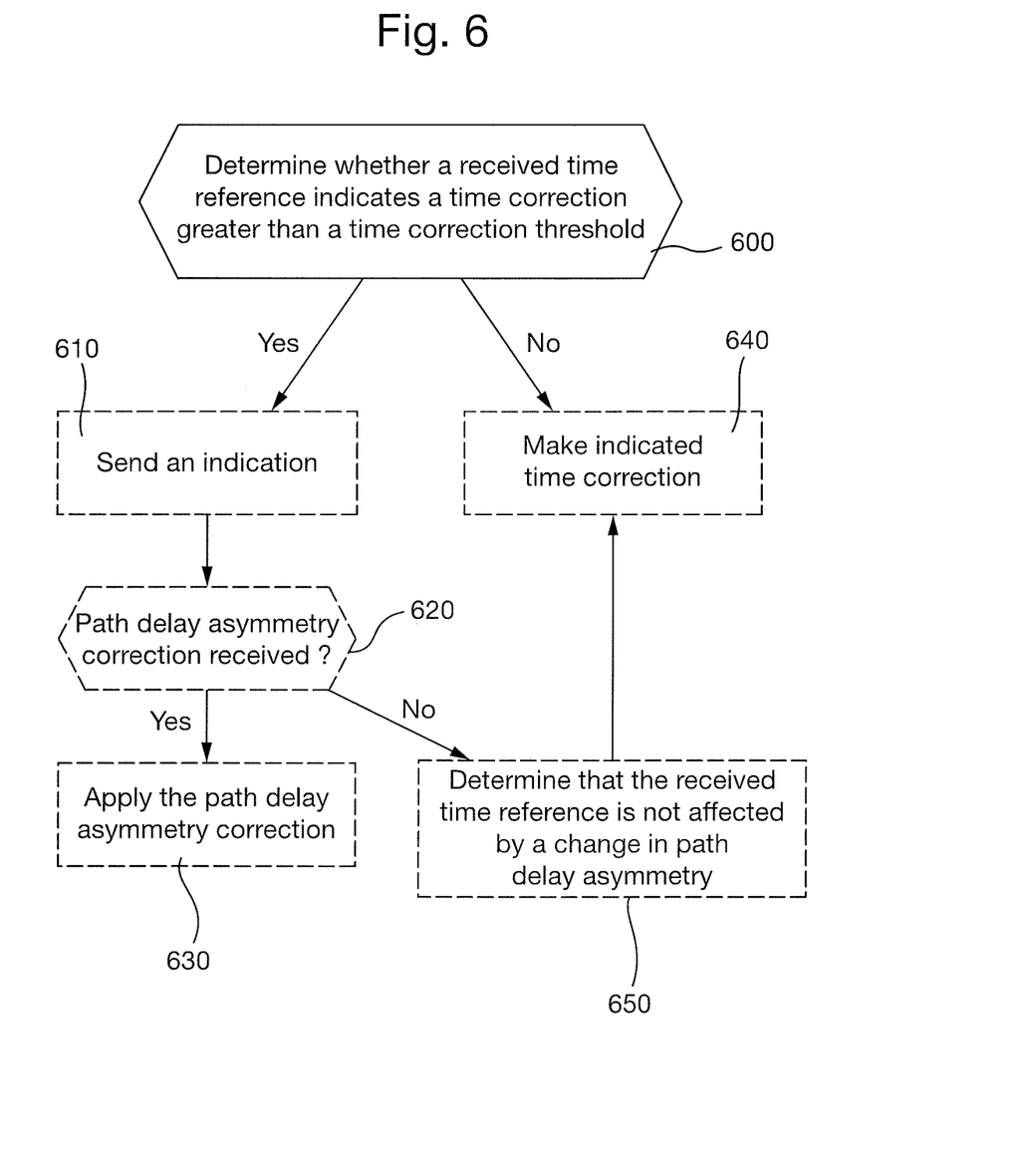
FIG. 6 is a flow chart showing steps at a slave node according to a preferred embodiment of the present invention.
Figure 7:
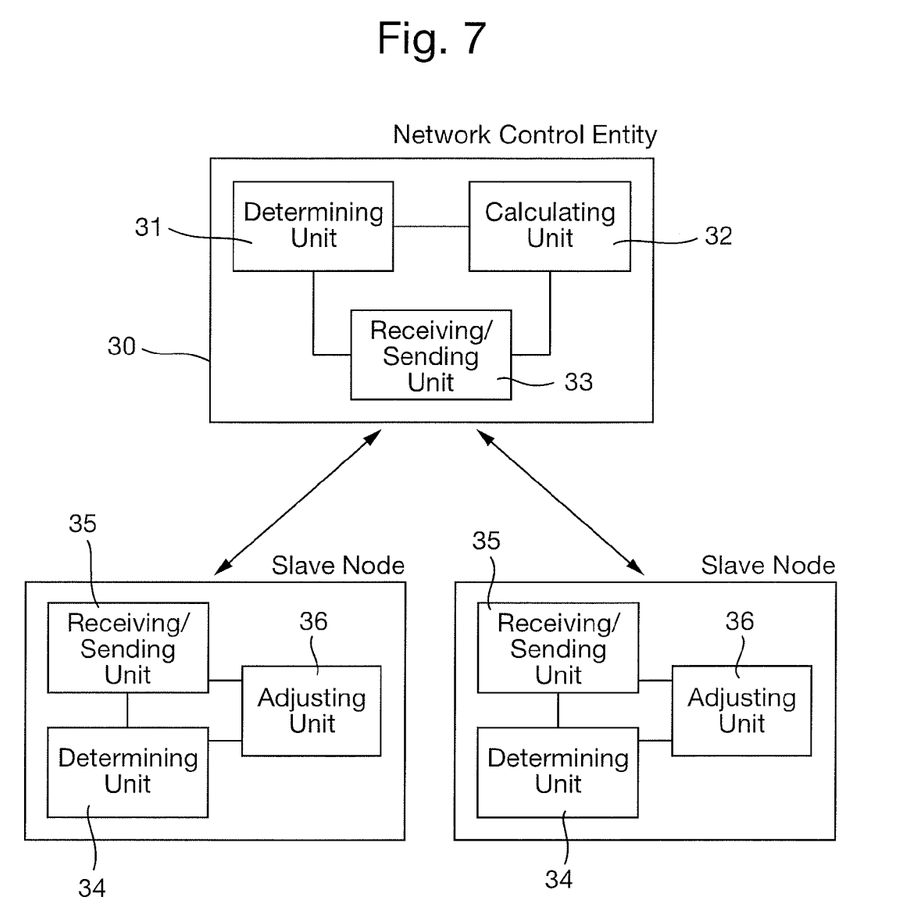
FIG. 7 is a schematic diagram illustrating apparatus according to embodiments of the present invention.

FIG. 5 is a flow chart showing steps according to a preferred embodiment of the invention for detecting timing references affected by a change in path delay asymmetry. FIG. 6 is a flow chart showing steps performed at each of the slave nodes, according to a preferred embodiment of the invention.

With reference to FIG. 6, in a preferred embodiment, each slave node determines, at step 600, whether a timing reference received by that node indicates a time correction greater than a time correction threshold. And, if so, at step 610, the slave node sends or transmits an indication that a timing reference received by that node indicates a time correction greater than the time correction threshold, in this example to a network control entity 20. The indication may comprise a value representing the time correction required by the timing reference.

If, on the other hand, the slave node determines that the timing reference indicates a time correction smaller than the time correction threshold, at step 640, the slave node may simply make the appropriate correction to its slave clock.

Network control entity 20 is arranged to communicate with each of the slave nodes, and may have knowledge of the topology of the network.

In this preferred embodiment, with reference to FIG. 5, network control entity 20 receives, at step 500, where a slave node has received a timing reference indicating or requiring a time correction greater than a time correction threshold, the indication transmitted by the slave node. And based thereon, network control entity 20 determines that a timing reference received by that node requires a time correction greater than a time correction threshold. Thus, in this way, at step 510, network control entity 20 may determine that a first slave node, in this example node X, has received a first timing reference requiring a time correction greater than a time correction threshold.

In this example, this first timing reference is a primary timing reference transmitted to the slave node by the master node as described above. However, the timing reference may be any other timing reference, such as a passive timing reference or, where the network uses synchronous Ethernet, a SyncE frequency reference.

Network control entity 20 may also determine, at step 520, for each of one or more other slave nodes, whether they have received a timing reference indicating a time correction greater than a time correction threshold. If the network control entity 20 has not received an indication from a slave node that a timing reference received by that node indicates or requires a time correction greater than a time correction threshold, the network control entity 20 may determine that that node has not received a timing reference requiring a time correction greater than the time correction threshold.

Network control entity 20 may now determine, at step 530, whether the timing reference received by the first node, in this example node X, is affected by a change in path delay asymmetry. In particular, this determination may be based, for example, on which, if any, of the other slave nodes have received a timing reference indicating a time correction greater than a predetermined threshold, and knowledge of the network topology.

For example, referring to FIG. 4, if the fault between nodes A and X causes a change in path delay asymmetry between those nodes, the primary timing reference received by node A will be unaffected. However, the primary timing reference received by node B will be affected. The primary timing reference received by nodes B, C and T-TSC will also be unaffected. Thus, based on which nodes have received a timing reference indicating a time correction greater than a correction attributable to clock drift, and knowledge of the network topology, the network control entity 20 may determine that a change in path delay asymmetry is localised between nodes A and X, and therefore that the primary synchronisation reference is affected by a change in path delay asymmetry.

The time available for the network control entity to determine whether a timing reference is affected by a change in path delay asymmetry depends on the clock bandwidth. Assume as an example that clock bandwidth is 0.1 Hz (that is a value currently being considered in the ITU-T standardization of the time synchronization profile for PTP). Thus, the network control entity may have several seconds to detect a timing reference affected by a change in path delay asymmetry. Preferably, the slave clock is not updated or corrected as indicated by a timing reference until it is determined whether the timing reference is affected by a change in path delay asymmetry. This may be achieved by forcing the node to enter a holdover state, until the determination is made as to whether the timing reference is affected by path delay asymmetry. Holdover may be achieved by clocks which include a stable oscillator.

In preferred embodiments, the network control entity 20 may further receive an indication, for example a signal or input, if one or more network resources are undergoing a re-configuration, for example because maintenance or an upgrade is being performed. In this case, the network control entity 20 may delay determining whether a timing reference is affected by a change in path delay asymmetry, and updating or adjusting the slave nodes local clock, until after the re-configuration is completed and the network is stable. Again, this may be achieved by forcing the node to enter a holdover state.

Referring again to FIG. 5, if it is determined that a first timing reference received by a slave node is affected by a change in path delay asymmetry, at step 540, a path delay asymmetry correction for the timing reference may be determined by network control entity 20. Alternatively, this step may be performed by a different network entity, for example the slave node.

In a preferred embodiment, as mentioned above, the network control entity 20 receives a value representing the time correction required by the slave node. In addition, the network control entity 20 may receive a value representing the time correction received by a second timing reference received by that slave node which is not affected by a change in path delay asymmetry. This second timing reference may for example be a timing reference received at a different interface of the node. The second timing reference travels along a different path to the slave node from the first timing reference.

The network control entity 20 may then determine a path delay asymmetry correction for the first timing reference based on the difference between the timing correction required by the first timing reference and the timing correction required by the second timing reference, which indicates a correction, if any, needed to account for clock drift. In particular, the path delay asymmetry may be calculated as two times the difference between the timing correction required by the first timing reference and the timing correction required by the second timing reference. For example, if the primary timing reference requires a time correction of 1.2 microseconds and the secondary timing reference requires a time correction of 500 nanosecond, the change in path delay asymmetry may result in a path delay asymmetry of 2×(1200−500)=1.4 microseconds. This path delay asymmetry may then, at step 550, be sent to the slave node. The slave node may then apply the applicable path delay asymmetry correction, in order to synchronise the slave node with the master node based on the primary timing reference.

FIG. 6 shows steps at the slave node according to this preferred embodiment. At step 620, the slave receives a path delay asymmetry correction for the first timing reference; i.e. for the path travelled by the first timing reference. At step 630, the slave node may apply the path delay asymmetry correction.

Alternatively, other means for determining a path delay asymmetry correction may be used, for example as disclosed in WO 2012/110109. In this method dedicated hardware is provided at each of the slave nodes for determining current path delay asymmetry. These determinations are then sent to a central control entity which calculates path delay asymmetry for an end-to-end path between nodes.

If it is determined that the first timing reference is not affected by a change in path delay asymmetry, with reference to FIG. 5, preferably, at step 570, the first slave node is informed accordingly, for example by sending an indication to the slave node that the first timing reference is not affected by a change in path delay asymmetry. With reference to FIG. 6, at step 650, the slave node may thereby determine that the first timing reference is not affected by a change in path delay asymmetry, and proceed at step 640 to make the indicated time correction.

FIG. 5 is a schematic diagram of apparatus according to preferred embodiments of the present invention. In this example, apparatus 30 for detecting a timing reference affected by a change in path delay asymmetry between nodes is comprised within a network control entity. The network control entity may be, for example, a network management system (NMS), a control plane manager or a Software Defined Network (SDN) controller.

The apparatus 30 comprises a determining unit 31 configured to determine that a first timing reference received by a first slave node indicates a time correction to its slave clock greater than a time correction threshold, for example by receiving an indication that the first timing reference indicates a time correction greater than a time correction threshold from the first slave node at receiving unit 33. The determining unit 31 is further configured to determine whether timing references received by one or more other slave nodes indicate a time correction to their respective slave clocks greater than a time correction threshold; and, based on the determining, determine whether the first timing reference is affected by a change in path delay asymmetry. The apparatus 20 may further comprise a determining or calculating unit 32 configured to determine a path delay asymmetry correction for the first timing reference, and a sending unit 33 configured to send the path delay asymmetry correction to the first slave node.

The determining unit 31, receiving unit, sending unit 33 and/or the calculating unit 32 may comprise a processor. As indicated by the arrows, apparatus 30 may be configured to communicate with each of at least two slave nodes. In some embodiments, some of the slave nodes may be in a different network domain to the other slave nodes, and the different network domains may comprise respective technologies. For example, one domain may use packet-switching, and another may be use wavelength-switching.

In preferred embodiments, each of the slave nodes 10 comprises a determining unit 34 configured to determine that a timing reference received by the node indicates or requires a time correction to its slave clock greater than a time correction threshold, and a sending unit 35 configured to send an indication to apparatus 30 that a timing reference received by the node indicates a time correction greater than a time correction threshold. The indication may comprise a value representing the time correction required by the timing reference. Each of the slave nodes 10 may further comprise an adjusting or applying unit 36 and a receiving unit 34 configured to receive a path delay asymmetry correction for a timing reference, for example from apparatus 30, and apply the path delay asymmetry correction. The adjusting unit 36 may be configured to adjust the slave nodes local clock.

The determining unit 34, receiving unit, sending unit 35 and/or adjusting unit 36 may comprise a processor. The receiving/sending unit 35 may further comprise an interface for communicating with apparatus 30, for example by transmitting a signal across the communications network.

Thus, embodiments of the present invention have the advantage that a timing reference affected by a change in path delay asymmetry may be detected, and therefore an appropriate correction made. In contrast to the "majority vote" method, three independent synchronisation references are not required and, moreover, embodiments of the present invention may lead to more accurate detection of timing references affected by a change in path delay asymmetry than the "majority vote" method. Thus, embodiments of the present invention are particularly advantageous for use in communications networks such as mobile backhaul networks transmitting WCDMA or LTE signals, which have strict synchronisation requirements.

The invention claimed is:

1. A method of detecting a timing reference affected by a change in path delay asymmetry in a communications network comprising a master node having a master clock and a plurality of slave nodes each having a respective slave clock, the method comprising:
   determining that a first timing reference received by a first slave node indicates a time correction to its slave clock greater than a time correction threshold;
   determining whether one or more other slave nodes have received a timing reference indicating a time correction to their slave clock greater than a time correction threshold; and
   determining whether the first timing reference is affected by a change in path delay asymmetry based on the determining of whether one or more other slave nodes have received a timing reference indicating a time correction to their slave clock greater than a time correction threshold.

2. A method according to claim 1, wherein determining whether the first time correction is affected by a change in path delay asymmetry comprises:
   determining whether the first timing reference is affected by a change in path delay asymmetry based on which, if any, of the one or more other slave nodes have received a timing reference indicating a time correction to their slave clock greater than a time correction threshold and knowledge of the topology of the communications network.

3. A method according to claim 1, wherein determining that the first timing reference received by the first slave node indicates a time correction to its slave clock greater than a time correction threshold comprises:
   receiving an indication that a timing reference received by the first slave node indicates a time correction to its slave clock greater than a time correction threshold; and
   determining that the first timing reference received by the first slave node indicates a time correction to its slave clock greater than a time correction threshold based on the indication.

4. A method according to claim 1, wherein determining whether one or more other slave nodes have received a timing reference indicating a time correction to their slave clock greater than a time correction threshold, comprises:
   for each of the one or more other slave nodes which has received a timing reference indicating a time correction to its slave clock greater than a time correction threshold, receiving an indication that a timing reference received by that slave node indicates a time correction to its slave clock greater than a time correction threshold; and
   determining whether the one or more other slave nodes have received a timing reference indicating a time correction to their slave clocks greater than a time correction threshold based on the, if any, indication(s).

5. A method according to claim 1, further comprising:
   determining a path delay asymmetry correction for the first timing reference.

6. A method according to claim 5, wherein the first slave node receives a second timing reference, and determining a path delay asymmetry correction for the first timing reference comprises:
   determining a path delay asymmetry correction for the first timing reference based on a difference between the timing correction indicated by the first timing reference and the timing correction indicated by the second timing reference.

7. A method according to claim 5, further comprising:
   sending the path delay asymmetry correction for the first timing reference to the first slave node.

8. A method according to claim 1, further comprising:
   receiving an indication that a network resource is undergoing a re-configuration; and
   delaying determining whether a first timing reference received by a first node is affected by a change in path delay asymmetry until the network resource is re-configured.

9. Apparatus for detecting a timing reference affected by a change in path delay asymmetry in a communications network comprising a master node having a master clock and a plurality of slave nodes each having a respective slave clock, the apparatus comprising:

a processor configured to:
  determine that a first timing reference received by a first slave node indicates a time correction to its slave clock greater than a time correction threshold;
  determine whether one or more other slave nodes have received a timing reference indicating a time correction to their slave clock greater than a time correction threshold; and
  determine whether the first timing reference is affected by a change in path delay asymmetry based on whether the one or more slave nodes have received a timing reference indicating a time correction to their slave clock greater than a time correction threshold.

10. Apparatus according to claim 9, wherein the processor is configured to determine whether the first time correction is affected by a change in path delay asymmetry based on which, if any, of the one or more other slave nodes have received a timing reference indicating a time correction to their slave clock greater than a time correction threshold and knowledge of the topology of the communications network.

11. Apparatus according to claim 9, further comprising:
  a receiver configured to receive an indication that a timing reference received by the first slave node indicates a time correction to its slave clock greater than a time correction threshold; and
  wherein the processor is configured to determine that the first timing reference received by the first slave node indicates a time correction to its slave clock greater than a time correction threshold based on the indication.

12. Apparatus according to claim 9, further comprising:
  a receiver configured to, for each of the one or more other slave nodes which has received a timing reference indicating a time correction to its slave clock greater than a time correction threshold, receive an indication that a timing reference received by that slave node indicates a time correction to its slave clock greater than a time correction threshold; and
  wherein the processor is configured to determine whether the one or more other slave nodes have received a timing reference indicating a time correction to their slave clocks greater than a time correction threshold based on the, if any, indication(s).

13. Apparatus according to claim 9, wherein the processor is further configured to:
  determine a path delay asymmetry correction for the first timing reference.

14. Apparatus according to claim 13, wherein the first slave node receives a second timing reference, and the processor is configured to:
  determine a path delay asymmetry correction for the first timing reference based on a difference between the timing correction indicated by the first timing reference and the timing correction indicated by the second timing reference.

15. Apparatus according to claim 14, further comprising:
  a transmitter configured to send the path delay asymmetry correction for the first timing reference to the first slave node.

16. Apparatus according to claim 9, wherein the processor is further configured to:
  receive an indication that a network resource is undergoing a re-configuration; and
  delay determining whether a first timing reference received by a first node is affected by a change in path delay asymmetry until the network resource is re-configured.

17. A network control entity comprising apparatus according to claim 9.

18. A network control entity according to claim 17, wherein the network control entity is a network management system (NMS), a control plane manager or a software defined network (SDN) controller.

19. A network control entity according to claim 17, wherein the network control entity is configured to communicate with a plurality of network domains.

20. A method comprising, at a slave node having a slave clock:
  determining that a timing reference received by the slave node indicates a timing correction to its slave clock greater than a time correction threshold; and
  sending an indication that a timing reference received by the slave node indicates a time correction to its slave clock greater than the time correction threshold to apparatus for detecting a timing reference affected by a change in path delay asymmetry according claim 9.

21. A method according to claim 20, wherein the indication comprises a value representing the timing correction indicated by the timing reference.

22. A method according to claim 20 further comprising:
  receiving a path delay asymmetry correction for the timing reference; and
  applying the path delay asymmetry correction.

23. Apparatus for a slave node having a slave clock, comprising:
  a processor configured to determine that a timing reference received by the slave node indicates a timing correction to its slave clock greater than a time correction threshold; and
  a transmitter configured to send an indication that a timing reference received by the slave node indicates a time correction to its slave clock greater than the time correction threshold to apparatus for detecting a timing reference affected by a change in path delay asymmetry according to claim 9.

24. Apparatus according to claim 23, further comprising:
  a receiver configured to receive a path delay asymmetry correction for the timing reference; and
  a processor configured to apply the path delay asymmetry correction.

25. A slave node comprising apparatus according to claim 23.

* * * * *